(12) United States Patent
Bhamri et al.

(10) Patent No.: US 12,294,964 B2
(45) Date of Patent: May 6, 2025

(54) MANAGING UPLINK TRANSMISSION WITH MULTIPLE TIMING ADVANCE GROUPS

(71) Applicant: Apple Inc., Cupertino, CA (US)

(72) Inventors: Ankit Bhamri, Bad Nauheim (DE); Dawei Zhang, Saratoga, CA (US); Sigen Ye, San Diego, CA (US); Wei Zeng, Saratoga, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 357 days.

(21) Appl. No.: 17/813,792

(22) Filed: Jul. 20, 2022

(65) Prior Publication Data

US 2024/0031962 A1    Jan. 25, 2024

(51) Int. Cl.
*H04W 56/00*    (2009.01)
(52) U.S. Cl.
CPC ... *H04W 56/0045* (2013.01); *H04W 56/0005* (2013.01)
(58) Field of Classification Search
None
See application file for complete search history.

(56) References Cited

U.S. PATENT DOCUMENTS

| 9,001,780 B2 | 4/2015 | Chen |
| 9,282,521 B2 * | 3/2016 | Lim .................... H04W 52/367 |
| 9,642,140 B2 | 5/2017 | Ng |
| 9,860,914 B2 | 1/2018 | Chen |
| 10,735,156 B2 | 8/2020 | Chen |
| 2013/0195048 A1 | 8/2013 | Ekpenyong |

(Continued)

OTHER PUBLICATIONS

Ericsson: "Extending the deployment scenarios for UE TX switching", 3GPP Draft; R4-2118123, 3rd Generation Partnership Project (3GPP), vol. RAN WG4, no. Electronic meeting; Nov. 1-12, 2021, XP052069584, Retrieved from the Internet: URL:https://ftp.3gpp.org/tsg_ran/WG4_Radio/TSGR4_101-e/Docs/R4-2118123.zipR4-2118123.doc [retrieved on Oct. 22, 2021].

(Continued)

*Primary Examiner* — Wutchung Chu
*Assistant Examiner* — Berhanu D Belete
(74) *Attorney, Agent, or Firm* — DICKINSON WRIGHT RLLP

(57) ABSTRACT

This application relates to wireless communications, including methods and apparatus to manage uplink (UL) transmit switching with multiple timing advance groups (TAGs) for wireless devices. A wireless device is configured to select N≥2 radio frequency carriers for UL transmission from M>N available radio frequency carriers and subsequently send UL transmissions to a cellular wireless network based on the configuration. The M available radio frequency carriers are divided into distinct TAGs, each TAG having a distinct timing advance value, and the N radio frequency carriers belong to a single TAG. The wireless device is further configured to switch to a second set of N UL radio frequency carriers, after an uplink switching gap time period, based on a TAG medium access control (MAC) control element (CE), received the cellular wireless network, which specifies a second TAG from which to select the second set of N UL radio frequency carriers.

20 Claims, 12 Drawing Sheets

(56) References Cited

U.S. PATENT DOCUMENTS

| | | | |
|---|---|---|---|
| 2014/0050194 A1* | 2/2014 | Gaal | H04W 72/0453 |
| | | | 370/330 |
| 2014/0105141 A1 | 4/2014 | Noh | |
| 2015/0031410 A1* | 1/2015 | Lim | H04W 52/146 |
| | | | 455/522 |
| 2019/0044678 A1* | 2/2019 | Liu | H04L 5/0091 |
| 2019/0053237 A1 | 2/2019 | Rico Alvarino | |
| 2019/0190580 A1* | 6/2019 | Dinan | H04L 5/0098 |
| 2020/0229103 A1 | 7/2020 | Hosseini | |
| 2020/0235871 A1* | 7/2020 | Kim | H04W 56/0045 |
| 2020/0383167 A1* | 12/2020 | Sengupta | H04W 76/19 |
| 2021/0329635 A1* | 10/2021 | Ng | H04W 72/0453 |
| 2022/0060981 A1* | 2/2022 | Zhou | H04W 52/0206 |
| 2022/0086875 A1 | 3/2022 | Xu | |
| 2022/0322390 A1 | 10/2022 | Nogami | |
| 2023/0232406 A1* | 7/2023 | Ouchi | H04L 27/2602 |
| | | | 370/329 |
| 2024/0031967 A1 | 1/2024 | Bhamri et al. | |
| 2024/0147471 A1* | 5/2024 | Islam | H04W 72/51 |
| 2024/0250799 A1* | 7/2024 | Rastegardoost | H04L 5/0096 |

OTHER PUBLICATIONS

CATT: "Discussion on Multi-carrier UL Tx switching scheme", 3GPP Draft; R1-2205137, 3rd Generation Partnership Project (3GPP), vol. RAN WG1, no. e-Meeting; May 9-20, 2022, XP052203969, Retrieved from the Internet: URL:https ://ftp.3gpp.org/tsg_ran/WG1_RL1/TSGR1_109-e/Docs/R1-2205137.zipR1-2205137.docx [retrieved on May 3, 2022].
PCT Patent Application No. PCT/US2023/027385—International Search Report and Written Opinion dated Jan. 12, 2024.
U.S. Appl. No. 17/813,783, Notice of Allowance dated Nov. 27, 2024.

* cited by examiner

MANAGING UPLINK TRANSMISSION WITH MULTIPLE TIMING ADVANCE GROUPS

FIELD

The described embodiments relate to wireless communications, including methods and apparatus to manage uplink transmit switching with multiple timing advance groups for wireless devices.

BACKGROUND

Newer generation, e.g., fifth generation (5G) new radio (NR), cellular wireless networks that implement one or more $3^{rd}$ Generation Partnership Project (3GPP) 5G standards are rapidly being developed and deployed by network operators worldwide. The newer cellular wireless networks provide a range of packet-based services, with 5G technology providing increased data throughput and lower latency connections that promise enhanced mobile broadband services for wireless devices. The higher data throughput and lower latency of 5G is expected to usher in a range of new applications and services as well as improve existing ones. 5G uplink (UL) transmission can use orthogonal frequency division multiplexing (OFDM) with transmissions of different wireless devices to a cellular wireless network overlapping in time. A cellular base station aligns reception of UL transmit frames sent from different wireless devices using timing advance commands sent to each wireless device. 5G standards also support simultaneous use of multiple UL transmit carriers by a single wireless device, referred to as carrier aggregation, where the cellular wireless network aggregates the transmissions sent on different UL transmit carriers for the wireless device. In some cases, UL transmit carriers from a wireless device terminate on one or more distinct cells of a base station that have a common timing advance value and a common downlink timing reference signal, referred to as a timing advance group (TAG). In some cases, UL transmit carriers from a wireless device belong to different timing advance groups and require different timing advance values. 5G standards also allow for a wireless device to switch transmission dynamically to use different carriers on different radio frequencies. The radio frequency spectrum allocated for 5G communication is divided into radio frequency bands that span various radio frequency ranges. Switching among carriers within a radio frequency band is referred to as intra-band switching, while switching among carriers across different radio frequency bands is referred to as inter-band switching. Presently, UL transmit switching is restricted to using a set of carriers that belong to a single timing advance group. This limitation restricts the flexibility to use a broader available set of carriers. There exists a need for mechanisms to manage uplink transmit switching with multiple timing advance groups for wireless devices.

SUMMARY

This application relates to wireless communications, including methods and apparatus to manage uplink (UL) transmit switching with multiple timing advance groups (TAGs) for wireless devices. A wireless device can transmit on multiple carriers simultaneously, where the multiple carriers can belong to a single TAG or to multiple TAGs. The wireless device can be configured to use up to N≥2 carriers from an available set of M≥N carriers. For greatest flexibility, the set of available M carriers can span one or more radio frequency bands, and the set of configured N carriers can also span one or more radio frequency bands. The wireless device can switch among different carriers at different times, such as changing from carriers 1 and 2 to carriers 3 and 4. The wireless device determines an uplink switching gap time period between using a first set of carriers and using a second set of carriers and refrains from sending uplink transmissions during the uplink switching gap time period. When the second set of carriers (used after the switch) includes carriers that belong to different TAGs, the wireless device can determine whether a first UL transmission occasion for at least one carrier overlaps the switching gap time period. In some embodiments, when the first UL transmission occasion of at least one carrier in the second set of carriers, used after the switch, overlaps the switching gap time period, the wireless device refrains from transmitting during the first UL transmission occasion of the at least one carrier in the second set of carriers. In some embodiments, when the first UL transmission occasion of at least one carrier in the second set of carriers, used after the switch, overlaps the switching gap time period, the wireless device refrains from transmitting during the first UL transmission occasion of all carriers in the second set of carriers. When the first UL transmission occasion for all carriers in the second set of carriers does not overlap the switching gap time period, the wireless device can transmit during the first UL transmission occasions on one or more carriers in the second set of carriers. In some embodiments, the wireless device is scheduled for UL transmission simultaneously on the first UL transmission occasions of at least two carriers in the second set of carriers. In some embodiments, the wireless device is scheduled for UL transmission using the first UL transmission occasion of only one of the carriers in the second set of carriers and is scheduled for UL transmissions using subsequent UL transmission occasions on one or more of the other carriers in the second set of carriers, e.g., sequentially in a time division multiplexing (TDM) manner. In some embodiments, the set of available M carriers belong to at least two different TAGs, and the set of configurable N carriers used by the wireless device at any one time are required to belong to the same TAG. In this case, the wireless device can switch among carriers in a single TAG or can switch to a different TAG but cannot use carriers in different TAGs at the same time. In some embodiments, a TAG medium access control (MAC) control element (CE) includes a TAG identifier (ID) that indicates implicitly which set of carriers to activate for UL transmit switching, e.g., each distinct TAG ID value specifies a different set of UL transmit carriers for the wireless device to use. The TAG MAC CE also includes a timing advance command (TAC) value indicating the amount of timing advance to apply for the UL transmit carriers. The set of carriers identified by the TAG ID belong to a common TAG. In some embodiments, when a wireless device switches between a first set of carriers belonging to a first TAG and a second set of carriers belonging to a second TAG, the wireless device uses the second set of carriers after a time period having a length of at least the length of i) a switching gap duration or ii) a timing adjustment duration, whichever is longer, e.g., ≥max{switching gap duration, timing adjustment duration}. In some embodiments, when a switching gap is not required, the wireless device includes a processing delay for uplink transmission to account for changes in timing advance when switching from using a first set of carriers belonging to a first TAG to a second set of carriers belonging to a second TAG.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
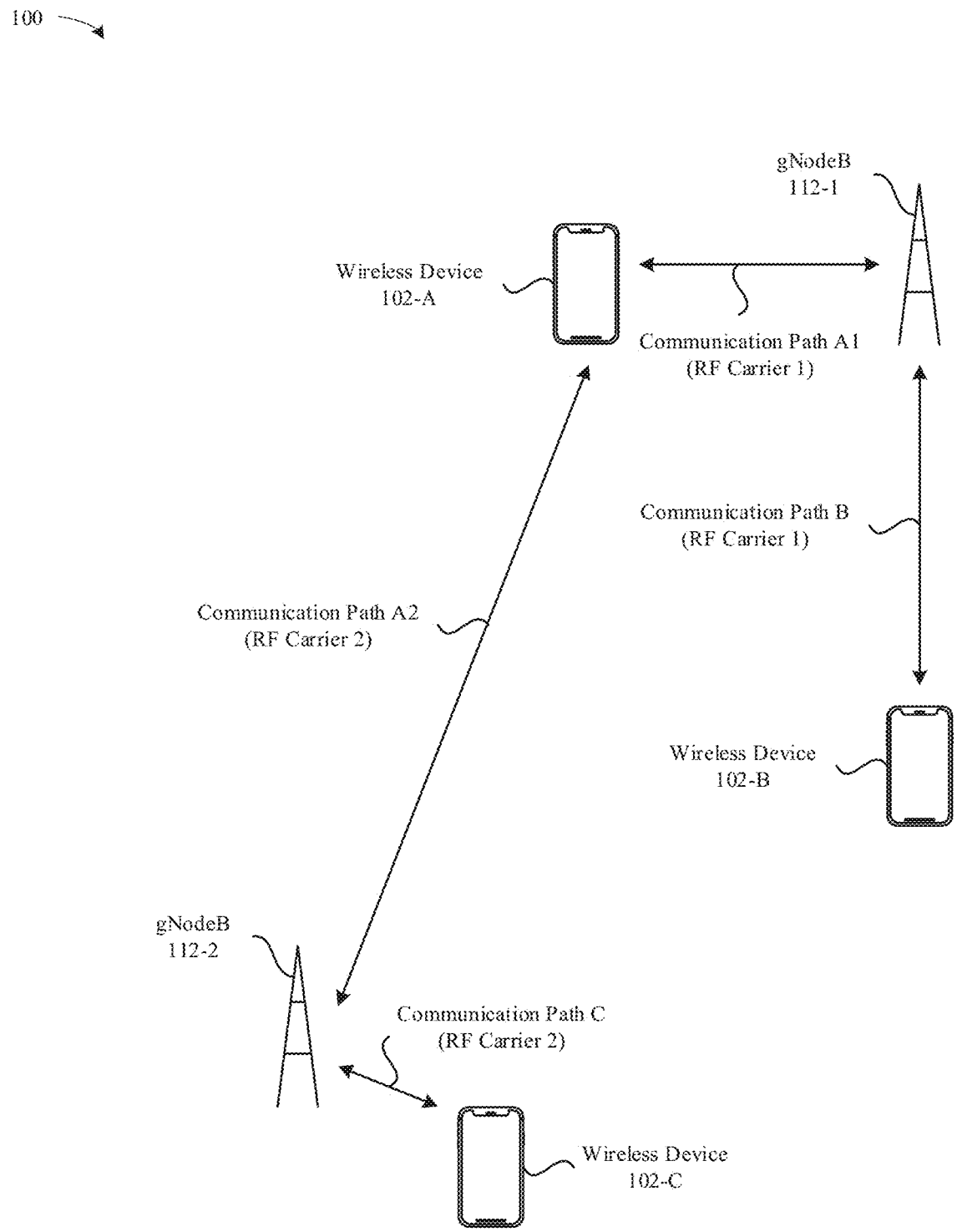
FIG. 1A illustrates a block diagram of different components of an exemplary system configured to implement uplink carrier aggregation for wireless devices, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

This application relates to wireless communications, including methods and apparatus to manage uplink (UL) transmit switching with multiple timing advance groups (TAGs) for wireless devices. A TAG refers to a set of cells of a base station that have a common timing advance value and a common downlink timing reference signal. A wireless device can transmit on multiple carriers simultaneously using carrier aggregation to provide flexibility and improved performance. Different uplink carriers used by the wireless device can belong to a common radio frequency (RF) band, e.g., intra-band carrier aggregation, or to different RF bands, inter-band carrier aggregation. Different uplink carriers can also terminate on cells of a single TAG or on cells that belong to different TAGs. When transmitting using carriers of a single TAG, uplink transmissions for each carrier can use the same timing advance value. When transmitting using carriers of different TAGs, uplink transmissions for one carrier can use a different timing advance value than uplink transmissions for another carrier. The 5G new radio (NR) release 16 and release 17 wireless communication standards include options for switching between different uplink carriers by a wireless device. In release 16, two different cases are specified. In a first case, the wireless device can transmit using two transmit chains on two distinct carriers (carriers 1 and 2), and in a second case, the wireless device can transmit using two transmit chains on a single carrier (carrier 2 only). In release 17, additional cases are specified to include i) transmitting using two transmit chains on carrier 1 and ii) transmitting using a first carrier in a first RF band and two contiguous carriers in a second RF band, i.e., both intra-band communication in the second RF band and inter-band communication across the first and second RF bands. In all cases, in releases 16 and 17, uplink transmission switching among carriers is constrained to using a single TAG, i.e., all carriers, among which the wireless device switches uplink transmission, must belong to the same TAG. As discussed further herein, uplink transmission switching is extended to carriers that can belong to different TAGs.

A wireless device can be configured to use a switching gap time period with no uplink transmissions allowed when switching between a first set of uplink carriers and a second set of uplink carriers. The wireless device can be configured to use up to $N \geq 2$ carriers from an available set of $M \geq N$ carriers. For greatest flexibility, the set of available M carriers can span one or more radio frequency bands, and the set of configured N carriers can also span one or more radio frequency bands. The wireless device can switch among different carriers at different times, such as changing from carriers 1 and 2 to carriers 3 and 4. The wireless device determines an uplink switching gap time period between using a first set of carriers and using a second set of carriers and refrains from sending uplink transmissions during the uplink switching gap time period. The first set of carriers, used before the switch, can belong to a single TAG or to multiple TAGs, and the second set of carriers, used after the switch, can also belong to a single TAG or to multiple TAGs. Timing advance values used by the second set of carriers can differ from timing advance values used by the first set of carriers, and timing advance values for different carriers in the second set of carriers, used after the switch, can vary as well. A switching gap time period specified before switching between the first set of carriers and the second set of carriers may be insufficiently long to accommodate the different timing advance values required for different carriers in the second set of carriers that belong to different TAGs. In some cases, a first uplink transmission occasion after the switching gap time period for a carrier in the second set of carriers can require a timing advance value that results in the first uplink transmission occasion overlapping the switching gap time period.

When the second set of carriers (used after the switch) include carriers that belong to different TAGs, the wireless device can determine whether a first UL transmission occasion for at least one carrier overlaps the switching gap time period. In some cases, first UL transmission occasions for all carriers in the second set of carriers do not overlap the switching gap time period. In some cases, first UL transmission occasions for one or more carriers in the second set of carriers overlap the switching gap time period. In some embodiments, when the first UL transmission occasion of at least one carrier in the second set of carriers, used after the switch, overlaps the switching gap time period, the wireless device refrains from transmitting during the first UL transmission occasion of the at least one carrier in the second set of carriers. In some embodiments, the wireless device requires that no UL transmissions be scheduled on first UL transmission occasions for one or more carriers in the second set of carriers used after switching from the first set of carriers. In some embodiments, the wireless device requires (or expects from the cellular wireless network) that no UL transmissions be scheduled on a carrier for which the first UL transmission occasion, after switching from a first set of carriers to a second set of carriers, overlaps a switching gap time period when applying the timing advance value for the carrier. In some embodiments, when the first UL transmission occasion of at least one carrier in the second set of carriers, used after the switch, overlaps the switching gap time period, the wireless device refrains from transmitting during the first UL transmission occasion of all carriers in the second set of carriers, including those carriers for which their respective timing advance value does not cause their respective first UL transmission occasion to overlap the switching gap time period. In some embodiments, the wireless device requires (or expects from the cellular wireless network) that no UL transmissions be scheduled during first UL transmission occasions on any carriers in a second set of carriers, after switching from a first set of carriers to a second set of carriers.

When the first UL transmission occasion for all carriers in the second set of carriers, used after the switch, does not overlap the switching gap time period, the wireless device can transmit (and/or be schedule to transmit) during the first UL transmission occasions on one or more carriers in the second set of carriers. In some embodiments, the wireless device is scheduled for UL transmission on the first UL transmission occasions of at least two carriers in the second set of carriers. In some embodiments, the wireless device is scheduled for UL transmission on the first UL transmission occasions of all carriers in the second set of carriers. In some embodiments, the wireless device is scheduled for UL transmission using the first UL transmission occasion of only one of the carriers in the second set of carriers and is scheduled for UL transmissions using subsequent UL transmission occasions on one or more of the other carriers in the second set of carriers, e.g., sequentially in a time division multiplexing (TDM) manner.

In some embodiments, the set of available M carriers can span one or more radio frequency bands, and the set of configured N carriers used by a wireless device at one time can also span one or more radio frequency bands. In some embodiments, the set of available M carriers belong to at least two different TAGs, and the set of configurable N carriers used by the wireless device at any one time are required to belong to the same TAG. In this case, the wireless device can switch among carriers in a single TAG or can switch to a different TAG but cannot use carriers in different TAGs at the same time. For example, a wireless device can be configured to use carriers two carriers (1, 2) that belong to a first TAG or to use two carriers (3, 4) that belong to a second TAG. In embodiments where the wireless device is not configurable to use carriers from different TAGs at the same time, combinations such as (1, 3), (1, 4), (2, 3), and (2, 4) are not allowed. In this case, when switching UL transmit carriers, the wireless device can recognize that all carriers will use the same timing advance value after the switch, as only carriers in a common TAG are used. In some embodiments, a TAG medium access control (MAC) control element (CE) includes a TAG identifier (ID) that indicates implicitly which set of carriers to activate for UL transmit switching, e.g., each distinct TAG ID value specifies a different set of UL transmit carriers for the wireless device to use. The TAG MAC CE also includes a timing advance command (TAC) value indicating the amount of timing advance to apply for the UL transmit carriers. The set of carriers identified by the TAG ID belong to a common TAG.

In some embodiments, the wireless device refrains from transmission during a time period to accommodate changes in timing advance values for all carriers when switching between combinations of UL transmit carriers. The time period with no transmission can be at least as long as required to allow timing advance values for all carriers to be accommodated. In some embodiments, when a wireless device switches between a first set of carriers belonging to a first TAG and a second set of carriers belonging to a second TAG, the wireless device uses the second set of carriers after a time period having a length of at least the length of i) a switching gap duration or ii) a timing adjustment duration, whichever is longer, e.g., ≥max {switching gap duration, timing adjustment duration}. In some embodiments, when a switching gap is not required, the wireless device includes a processing delay for uplink transmission to account for changes in timing advance when switching from using a first set of carriers belonging to a first TAG to a second set of carriers belonging to a second TAG.

These and other embodiments are discussed below with reference to FIGS. 1 through 4; however, those skilled in the art will readily appreciate that the detailed description given herein with respect to these figures is for explanatory purposes only and should not be construed as limiting.

FIG. 1A illustrates a block diagram 100 of different components of an exemplary system configured to implement uplink carrier aggregation for wireless devices. A first 5G base station, gNodeB 112-1, receives uplink transmissions on a first radio frequency (RF) carrier 1 from a first wireless device 102-A, via a first communication path A1, and from a second wireless device 102-B, via a second communication path B. The gNodeB 112-1 can require uplink transmissions from each of the first wireless device 102-A and the second wireless device 102-B be received approximately (within a cyclic prefix) frame aligned at the gNodeB 112-1 to allow for separating the received uplink transmissions using orthogonal frequency division multiplexing (OFDM). The first and second wireless devices 102-A, 102-B can be located at different distances from the gNodeB 112-1, and therefore a propagation delay for uplink transmissions from the first wireless device 102-A can differ from a corresponding propagation delay for uplink transmissions from the second wireless device 102-B. The gNodeB 112-1 can time align the received uplink transmissions from the first and second wireless devices 102-A, 102-B by sending a different timing advance value to each of the first and second wireless devices 102-A, 102-B. The first wireless device 102-A can also be connected to a second 5G base station, gNodeB 112-2, via a second communication path A2, and send uplink transmissions to the gNodeB 112-2 using a second RF carrier 2, different from the first RF carrier 1. The gNodeB 112-2 can also be connected to a third wireless device 102-C via a communication path C using the second RF carrier 2. As with gNodeB 112-1, gNodeB 112-2 can require time alignment of uplink transmissions received from the first wireless device 102-A and the third wireless device 102-C by sending timing advance values to the first and third wireless devices 102-A, 102-C. The gNodeB 112-1 and gNodeB 112-2 can aggregate uplink transmissions from the first wireless device 102-A received via the first carrier 1 and the second RF carrier 2 respectively. The first wireless device 102-A can be located at different distances from each of the gNodeB 112-1 and the gNodeB 112-2, and therefore timing advance values specified by the gNodeB 112-1 for uplink transmissions via communication path A1 on the first RF carrier 1 can differ from timing advance values specified by the gNodeB 112-2 for uplink transmissions via communication path A2 on the second RF carrier 2. FIG. 1A thus illustrates an example in which the first wireless device 102-A communicates uplink transmissions using RF carriers that below to two different timing advance groups (TAGs).

Figure 1B:
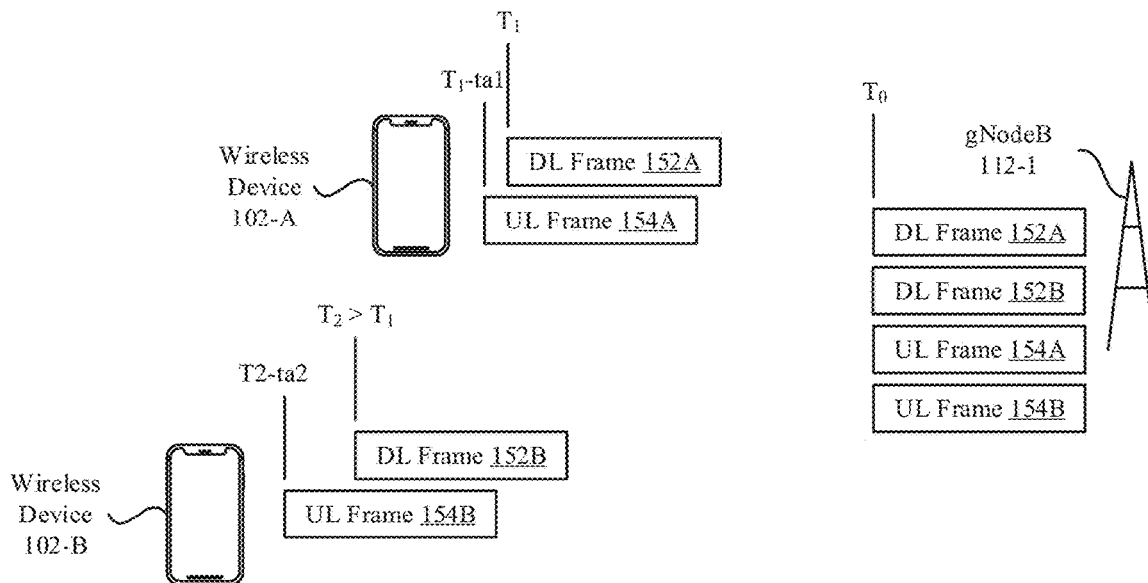
FIG. 1B illustrates exemplary uplink timing advance requirements for the wireless devices of FIG. 1A, according to some embodiments.
Figure 1B:
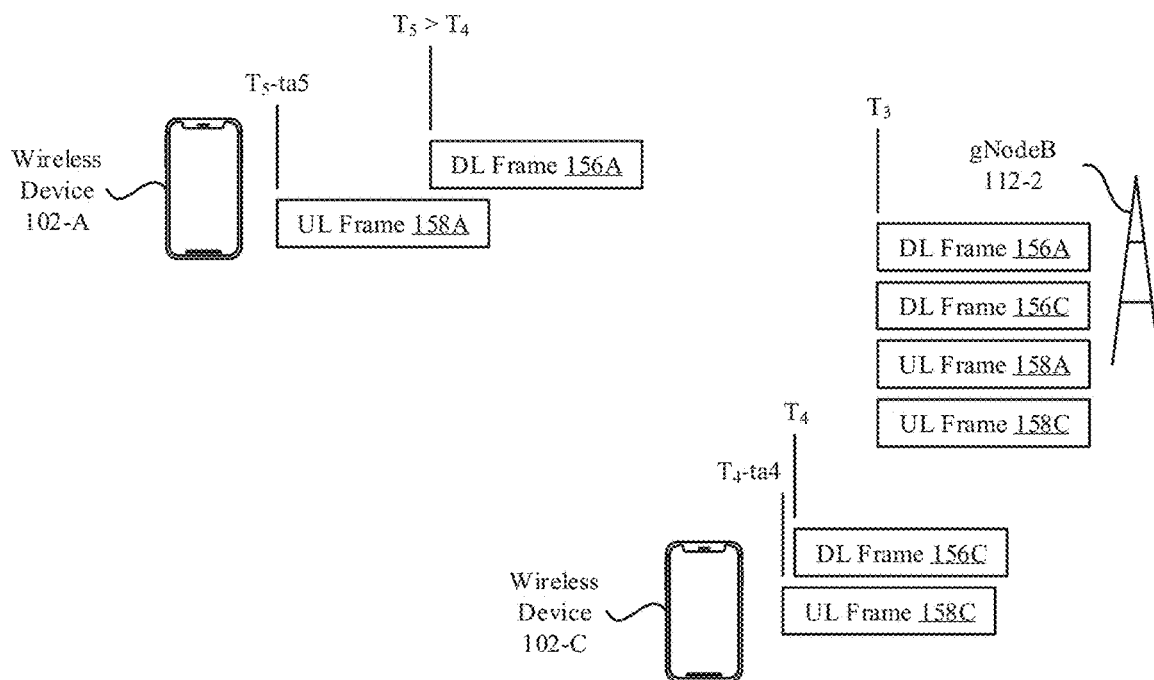

FIG. 1B illustrates diagrams 140, 150 of exemplary uplink timing advance requirements for the wireless devices 102-A, 102-B, and 102-C of FIG. 1A. At the first base station, gNodeB 112-1, downlink (DL) frame 152A is transmitted to the first wireless device 102-A at time $T_0$ and received by the first wireless device 102-A at time $T_1$. In order for the uplink (UL) frame 154A sent from the first wireless device 102-A to be received at gNodeB 112-1 time aligned with the DL frame 152A, the UL frame 154A is sent earlier, at time $T_1$-ta1, based on a timing advance value ta1 specified by the gNodeB 112-1. Separately, for the second wireless device 102-B, the gNodeB 112-1 sends a DL frame 152B at time T0, which is received at the second wireless device 102-B at time $T_2 > T_1$, as the second wireless device 102-B is located at a greater distance from the gNodeB 112-1 than the first wireless device 102-A, thereby incurring more propagation delay for transmissions to and from the gNodeB 112-1. In order for the UL frame 154B sent from the second wireless device 102-B to be received at gNodeB 112-1 time aligned with the DL frame 152B, the second wireless device 102-B transmits the UL frame 154B earlier, at time $T_2$-ta2, where the timing advance value ta2 is also specified by the gNodeB 112-1. The first wireless device 102-A is also connected to the second base station, gNodeB 112-2, which is located at a greater distance from the first wireless device 102-A than the first base station gNodeB 112-1. The second base station can be located closer to the third wireless device 102-C than to the first wireless device 102-A, and thus propagation delays (and corresponding timing advance values) for communication with the first wireless device 102-A can be longer than for communication with the third wireless device 102-C. The gNodeB 112-2 can specify a timing advance value ta4 for the third wireless device 102-C to use to align UL frame 158C relative to DL frame 156C and a different (higher) timing advance value ta5 for the first wireless device 102-A to use to align UL frame 158A relative to DL frame 156A. The timing advance values ta1 and ta5 for the first wireless device 102-A to use for communication with gNodeB 112-1 and gNodeB 112-2 respectively can be completely separate, and therefore the first carrier 1, used for communication by the first wireless device 102-A with gNodeB 112-1, and the second carrier 2, used for communication with gNodeB 112-2 by the first wireless device 102-A, can belong to different timing advance groups. Switching uplink transmissions by the first wireless device 102-A between different carriers that belong to different timing advance groups can require realignment of uplink transmission frames, as the timing advance values for carriers used before the switch and after the switch can differ.

Figure 1C:
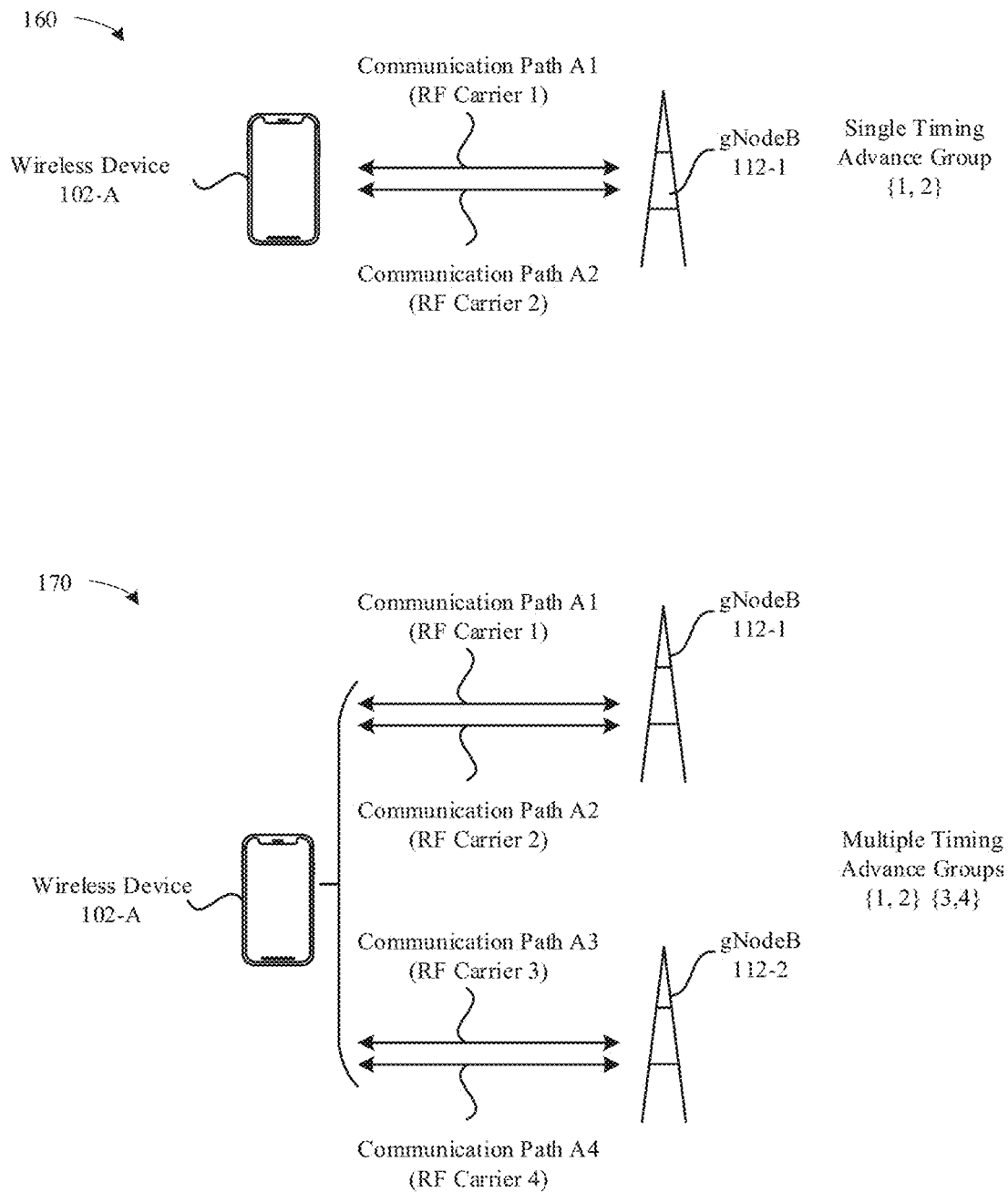
FIG. 1C illustrates an example of different timing advance groups (TAGs) for a wireless device, according to some embodiments.

FIG. 1C illustrates diagrams 160, 170 of communication by a wireless device 102-A using multiple RF carriers. In the first diagram 160, the wireless device 102-A communicates with a base station, gNodeB 112-1, using two parallel communication paths A1, A2 associated with two different RF carriers 1, 2 that belong to a common, single timing advance group (TAG), labeled as {1, 2}. Both RF carrier 1 and RF carrier 2 can use identical timing advance values. Alternatively, in the second diagram 170, the wireless device 102-A can communicate with the first base station, gNodeB 112-1, using RF carriers 1 and 2 of a first TAG {1, 2} or with a second base station, gNodeB 112-2, using RF carriers 3 and 4 of a second TAG {3, 4}. If the wireless device 102-A is restricted, when switching UL transmit carriers, to only use groups of RF carriers that belong to a common timing advance group at one time, then the wireless device 102-A can switch between use of RF carriers 1 and 2 of the first TAG {1, 2} and use of RF carriers 3 and 4 of the second TAG {3, 4}, but cannot use combinations of RF carriers that would belong to different TAGs, such as using RF carriers 1 and 3, 1 and 4, 2 and 3, or 2 and 4. As described herein, UL transmit carrier switching that can use combinations of RF carriers in different TAGs can provide for greater flexibility in UL communication management.

Figure 2A:
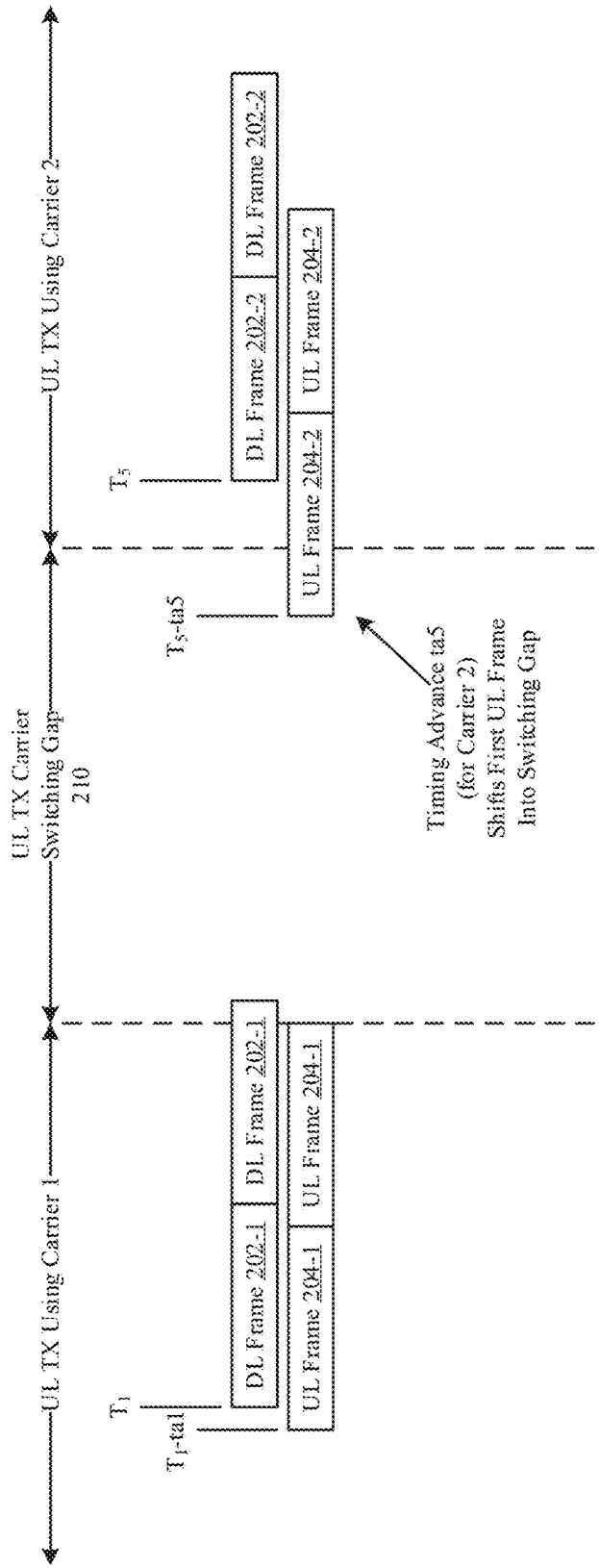
FIG. 2A illustrates an example of timing advance and switching gap misalignment for switching uplink transmit carriers, according to some embodiments.

FIG. 2A illustrates a diagram 200 of an example of timing advance misalignment that can occur when switching between UL transmit carriers that have different timing advance values, such as when switching between a first uplink transmit carrier in a first TAG and a second uplink transmit carrier in a second TAG. A wireless device 102 can enforce an UL transmit carrier switching gap 210 time period during which uplink transmissions are disallowed. The switching gap 210 time period allows for wireless circuitry of the wireless device 102 to effect changes and settle before using a different UL transmit carrier. In FIG. 2A, the wireless device uses a first UL transmit carrier 1 before the UL transmit carrier switching gap 210 time period, with a timing advance value of ta1 to shift uplink frames 204-1 relative to received downlink frames 202-1. A base station (gNodeB) 112 to which the wireless device 102 is connected sets the timing advance value ta1 to be used. The wireless device 102 can switch from using the first UL transmit carrier 1 to using a second UL transmit carrier 2 after the UL transmit carrier switching gap 210 time period. The length of the UL transmit carrier switching gap 210 time period can be set by the wireless device 102 based on estimates of time required by wireless circuitry of the wireless device 102. During the UL transmit carrier switching gap 210 time period, the wireless device 102 should not transmit UL frames. The wireless device 102 can communicate with a base station (gNodeB) 112 after the UL transmit carrier switching gap 210 time period using a second UL transmit carrier 2 that has a timing advance value of ta5 to use for shifting UL frames 204-2 relative to DL frames 202-2. In some cases, the timing advance value ta5 of the second UL transmit carrier 2 can shift a first UL transmission occasion for a first UL frame 204-2 into the UL transmit carrier switching gap 210 time period. When multiple UL transmit carriers that belong to a common TAG are used after the UL transmit carrier switching gap 210 time period, each of the multiple UL transmit carriers would have the identical timing advance value; however, when multiple UL transmit carriers that belong to different TAGs are used after the UL transmit carrier switching gap 210 time period, each of the multiple UL transmit carriers can have different timing advance values. In this case, first UL transmission occasions for some UL transmit carriers may be advanced into the UL transmit carrier switching gap 210 time period, while for other UL transmit carriers, the first UL transmission occasions may occur after the UL transmit carrier switching gap 210 time period. Solutions to address this misalignment when using multiple UL transmit carriers that belong to different TAGs are provided.

Figure 2B:
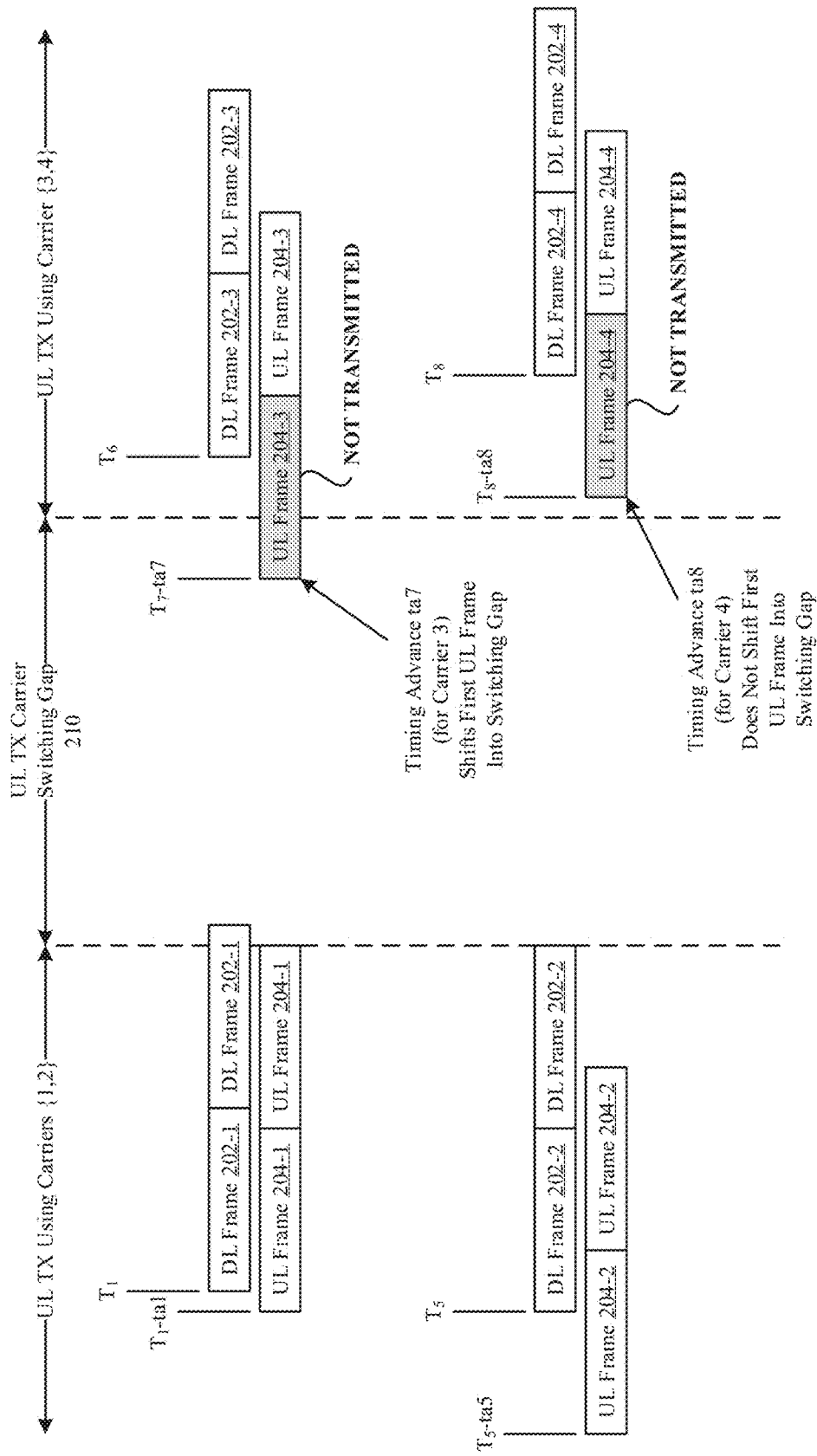
FIGS. 2B and 2C illustrate exemplary uplink transmission schemes that disallow certain uplink transmissions after switching uplink transmit carriers, according to some embodiments.

FIG. 2B illustrates a diagram 220 of an exemplary UL transmission scheme that disallows UL transmissions on select UL transmission occasions to accommodate switching UL transmit carriers that belong to different TAGs. A wireless device 102 uses a first set of UL transmit carriers {1, 2} before the UL transmit carrier switching gap 210 time period. The first UL transmit carrier 1 can belong to a first TAG having a timing advance value ta1, which shifts UL frames 204-1 relative to DL frames 202-1, while the second UL transmit carrier 2 can belong to a second TAG having a timing advance value ta5, which shifts UL frames 204-2 relative to DL frames 202-2. The wireless device 102 can shift UL transmit frames for each UL transmit carrier individually based on the corresponding timing advance values. The wireless device 102 can switch from using the first set of UL transmit carriers {1, 2} before the UL transmit carrier switching gap 210 time period to using a second set of UL transmit carriers {3, 4} after the UL transmit carrier switching gap 210 time period. The second set of UL transmit carriers {3, 4} can also belong to different TAGs. The third UL transmit carrier 3 can belong to a third TAG having a timing advance value ta7, while the fourth UL transmit carrier 4 can belong to a fourth TAG having a timing advance value ta8. As shown in FIG. 2B, the timing advance value ta7 for the third UL transmit carrier relative to the DL frame 202-3 can cause the first UL transmission occasion for the third UL transmit carrier (UL frame 204-3) to shift into the UL transmit carrier switching gap 210 time period, while the timing advance value ta8 for the fourth UL transmit carrier relative to the DL frame 202-4 can result in the first UL transmission occasion for the fourth UL transmit carrier (UL frame 204-4) to start after the UL transmit carrier switching gap 210 time period. To ensure no UL transmissions by the wireless device 102 during the UL transmit carrier switching gap 210 time period, the wireless device 102 can refrain from transmitting during the first UL transmission occasions of both the third UL transmit carrier and the fourth UL transmit carrier. In some embodiments, the wireless device 102 should not be scheduled for UL transmission on the first UL transmission occasions of any UL transmit carrier used after the UL transmit carrier switching gap 210 time period. The same solution can be applied to any number of (two or more) UL transmit carriers used after an UL transmit carrier switching gap 210 time period, where first UL transmission occasions of all UL transmit carriers used after the UL transmit carrier switching gap 210 time period are not used by the wireless device 102 (or expected to be scheduled by corresponding gNodeBs for transmission). While FIG. 2B illustrates the same number of UL transmit carriers used before and after the UL transmit carrier switching gap 210 time period, the same solution can also be applied when adding an UL transmit carrier that belongs to a different TAG from an existing set of UL transmit carriers (or belongs to one of multiple TAGs corresponding to the existing set of UL transmit carriers), as the use of multiple UL transmit carriers that belong to different TAGs can result in one or more first UL transmission occasions to overlap the UL transmit carrier switching gap 210 time period.

Figure 2C:
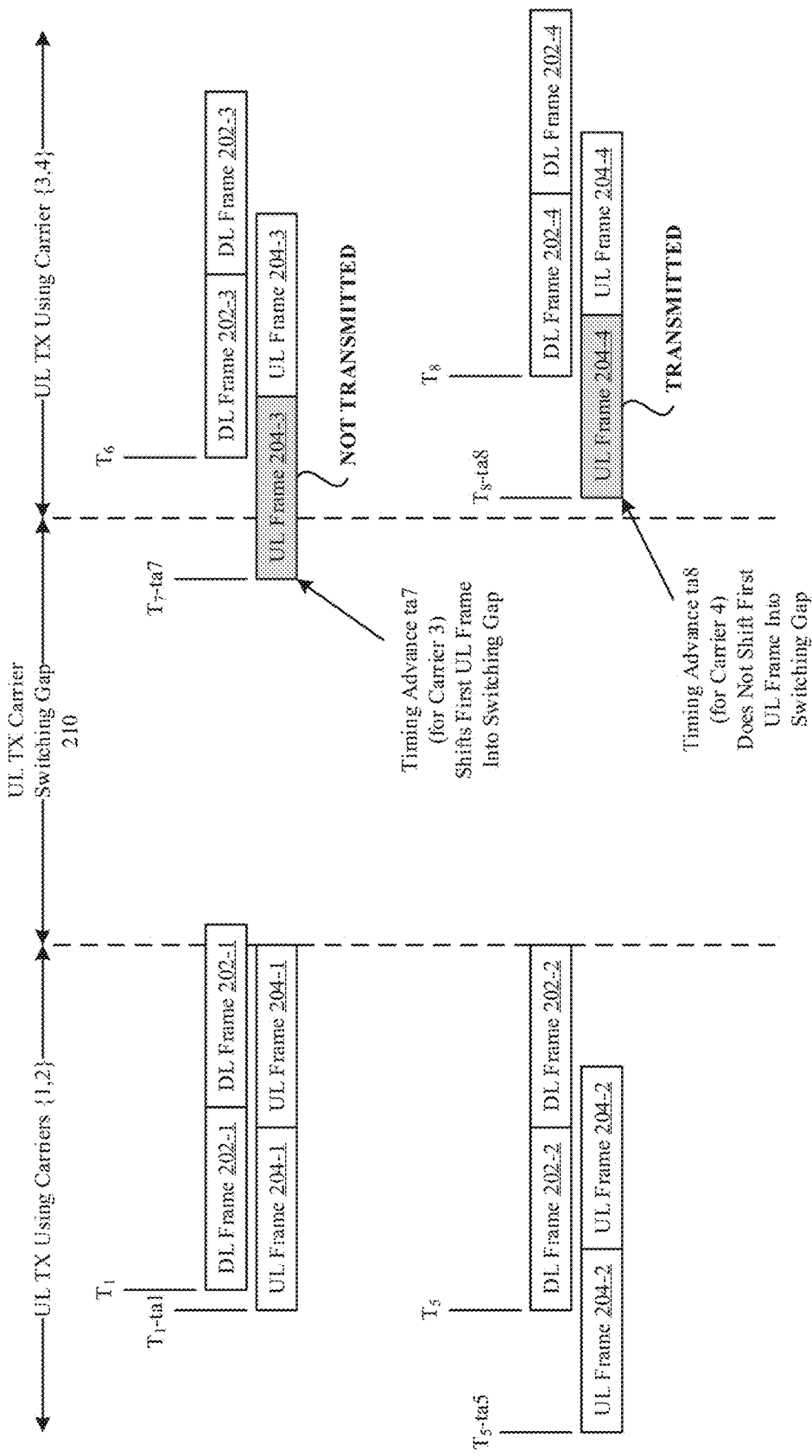

FIG. 2C illustrates a diagram 240 of another exemplary UL transmission scheme that disallows UL transmissions on select UL transmission occasions to accommodate switching UL transmit carriers that belong to different TAGs. As with the UL transmission scheme illustrated in FIG. 2B, the first UL transmission occasion for the third UL transmit carrier 3, with the timing advance value ta7, overlaps the UL transmit carrier switching gap 210 time period, while the first UL transmission occasion for the fourth UL transmit carrier 4, with the timing advance value ta8, does not overlap the UL transmit carrier switching gap 210 time period. In the UL transmission scheme of FIG. 2B, first UL transmission occasions for all UL transmit carriers are not used. In the UL transmission scheme of FIG. 2C, the wireless device 102 refrains from transmitting during the first UL transmission occasion of UL transmit carrier 3, but allows transmission during the first UL transmission occasion of UL transmit carrier 4. This solution can be applied to any number of (two or more) UL transmit carriers after an UL transmit carrier switching gap 210 time period, where first UL transmission occasions of any UL transmit carriers that overlap the UL transmit carrier switching gap 210 time period are not used (transmission disallowed and/or not scheduled), while any UL transmit carriers that do not overlap the UL transmit carrier switching gap 210 time period can be used (transmission allowed and/or can be scheduled).

Figure 2D:
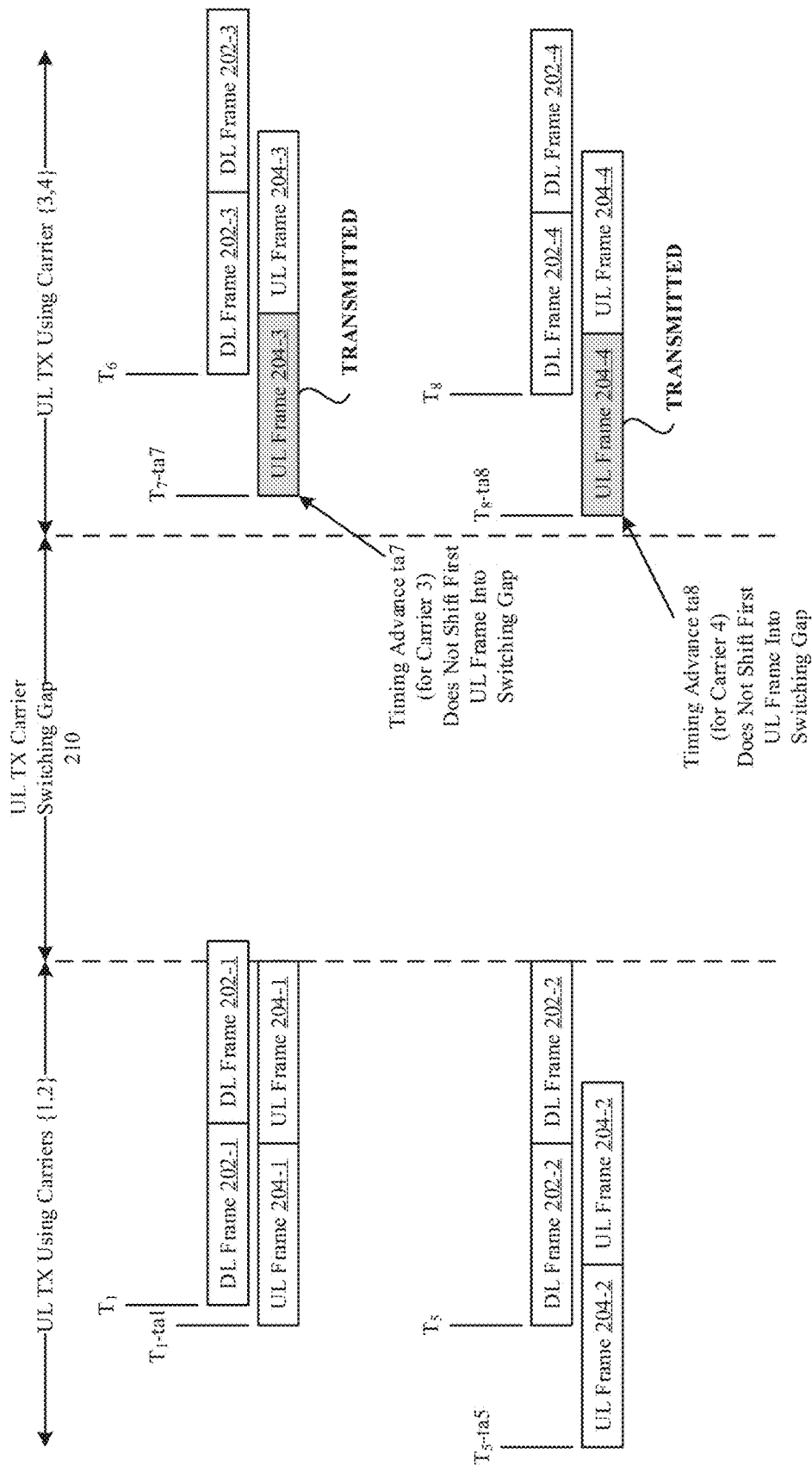
FIGS. 2D and 2E illustrates exemplary uplink transmission schemes that allow certain uplink transmissions after switching uplink transmit carriers, according to some embodiments.

FIG. 2D illustrates a diagram 260 of an exemplary UL transmission scheme that allows UL transmissions on select UL transmission occasions after switching UL transmit carriers that belong to different TAGs. A wireless device 102 uses a first set of UL transmit carriers {1, 2} before the UL transmit carrier switching gap 210 time period. The first UL transmit carrier 1 can belong to a first TAG having a timing advance value ta1, which shifts UL frames 204-1 relative to DL frames 202-1, while the second UL transmit carrier 2 can belong to a second TAG having a timing advance value ta5, which shifts UL frames 204-2 relative to DL frames 202-2. The wireless device 102 can shift UL transmit frames for each UL transmit carrier individually based on the corresponding timing advance values. The wireless device 102 can switch from using the first set of UL transmit carriers {1, 2} before the UL transmit carrier switching gap 210 time period to using a second set of UL transmit carriers {3, 4} after the UL transmit carrier switching gap 210 time period. The second set of UL transmit carriers {3, 4} can also belong to different TAGs. The third UL transmit carrier 3 can belong to a third TAG having a timing advance value ta7, while the fourth UL transmit carrier 4 can belong to a fourth TAG having a timing advance value ta8. As shown in FIG. 2D, the timing advance value ta7 for the third UL transmit carrier relative to the DL frame 202-3 results in the first UL transmission occasion for the third UL transmit carrier (UL frame 204-3) starting after the UL transmit carrier switching gap 210 time period (unlike in FIGS. 2B and 2C), and the timing advance value ta8 for the fourth UL transmit carrier relative to the DL frame 202-4 also results in the first UL transmission occasion for the fourth UL transmit carrier (UL frame 204-4) starting after the UL transmit carrier switching gap 210 time period. The first UL transmission occasions for both the third UL transmit carrier and the fourth UL transmit carrier can be used (and/or scheduled for transmission), and simultaneous transmission on the third and fourth UL transmit carriers with overlapping first UL transmission occasions can be allowed, depending on a capability of the wireless device 102 to support simultaneous UL transmission on two UL transmit carriers, which may be referred to as a dual UL transmit mode for UL transmit switching. (More generally, a wireless device 102 can be configurable to support multiple UL transmit carriers, which may be referred as a multiple UL transmit mode for UL transmit switching). This solution can be applied to any number of (two or more) UL transmit carriers after an UL transmit carrier switching gap 210 time period, where first UL transmission occasions of at least two (and up to all) UL transmit carriers can be simultaneously used (and/or scheduled for transmission) after the UL transmit carrier switching gap 210 time period.

Figure 2E:
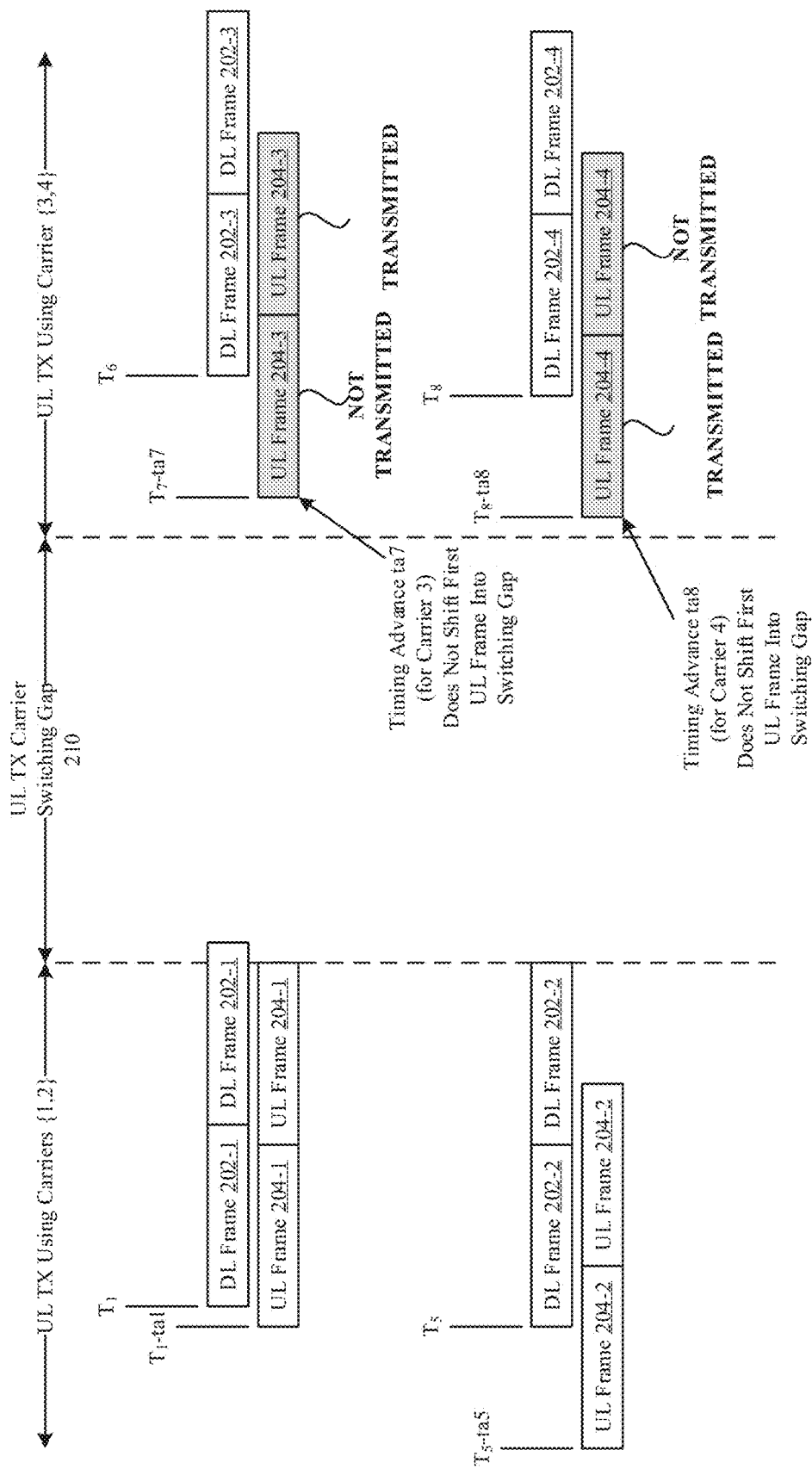

FIG. 2E illustrates a diagram 280 of another exemplary UL transmission scheme that allows UL transmissions on select UL transmission occasions after switching UL transmit carriers that belong to different TAGs. As in FIG. 2D, the wireless device 102 switches from using a first set of UL transmit carriers {1, 2} before the UL transmit carrier switching gap 210 time period to using a second set of UL transmit carriers {3, 4} after the UL transmit carrier switching gap 210 time period, and the UL transmit carriers in each set belong to different TAGs. The first UL transmission occasions for UL transmit carrier 3 and UL transmit carrier 4 each occur after the UL transmit carrier switching gap 210 time period. In the UL transmission scheme of FIG. 2E, UL transmissions are allowed (and/or scheduled) to occur sequentially, e.g., in non-overlapping time intervals, where the first UL transmission opportunity of UL transmit carrier 4 can be used to transmit (and/or be scheduled for transmission) the UL frame 204-4, while the first UL transmission opportunity of UL transmit carrier 3 can be not used to transmit (and/or not be scheduled for transmission) by the wireless device 102. Subsequently, the second UL transmission opportunity of UL transmit carrier 3 can be used to transmit (and/or be scheduled for transmission) UL frame 204-3, while the second UL transmission opportunity of UL transmit carrier 4 can be not used to transmit (and/or not be scheduled for transmission) by the wireless device 102. First UL transmissions on the UL transmit carriers after the UL transmit carrier switching gap 210 time period can occur in a time-division-multiplexing (TDM) manner using non-overlapping UL transmission occasions of each of the UL transmit carriers. This solution can be applied to any number of (two or more) UL transmit carriers after an UL transmit carrier switching gap 210 time period, where first UL transmissions of at least two (and up to all) UL transmit carriers can be transmitted (and/or scheduled for transmission) sequentially (or in non-overlapping UL transmission occasions) after the UL transmit carrier switching gap 210 time period.

In some embodiments, a wireless device 102 can be configured to use N<M UL transmit carriers (or radio frequency bands), where the M transmit carriers (RF bands) can be associated with different timing advance groups (TAGs). In some embodiments, the wireless device 102 is dynamically activated to use N UL transmit carriers (RF bands) out of the M available UL transmit carriers (RF bands), where the N UL transmit carriers (RF bands) must all belong to an identical TAG. For example, the wireless device 102 can be configured to use UL transmit carriers (RF bands) 1, 2, 3, and 4, where UL transmit carriers (RF bands) 1 and 2 belong to a first TAG 1 having a first timing advance value ta1 and UL transmit carriers (RF bands) 3 and 4 belong to a second TAG 2 having a second timing advance value ta2. The wireless device 102 can be dynamically activated to use UL transmit carriers {1, 2} or UL transmit carriers {3, 4} and can switch between these two pairs of UL transmit carriers, e.g., from {1, 2} to {3, 4} or from {3, 4} to {1, 2}; however, pairs of UL transmit carriers from two different TAGs, e.g., {1, 3}, {1, 4}, {2, 3}, and {2, 4} can be disallowed. With this restricted use of UL transmit carriers, before and after an UL transmit carrier switching gap 210, all UL transmit carriers used belong to a common, single TAG having a specified timing advance value (rather than belonging to two different TAGs having different timing advance values).

In some embodiments, a group of UL transmit carriers (or RF bands) allowed to be used together and belonging to an identical TAG can be indicated by a TAG identifier (ID) value included in a TAG medium access control (MAC) control element (CE) sent by the cellular wireless network to the wireless device 102. Each TAG can include one or more UL transmit carriers (or RF bands), and all UL transmit carriers (or RF bands) in the TAG can have the same timing advance value. In some embodiments, the TAG ID includes n bits to specify up to 2 n different TAGs, such as n=2 bits to specify 4 different TAGs. Dynamic activation of a particular TAG (and therefore a particular combination of UL transmit carriers or RF bands) can be implicitly commanded by the cellular wireless network to the wireless device 102 in a TAG MAC CE sent to the wireless device 102. For example, the wireless device 102 can be semi-statically configured to use UL transmit carriers (or RF bands) A and B associated with a TAG ID value of 0 and UL transmit carriers (or RF bands) C and D associated with a TAG ID value of 1. Receipt by the wireless device 102 of a TAG MAC CE that includes the TAG ID value of 0 from a gNodeB 112 of a cellular wireless network indicates that the wireless device 102 should use UL transmit carriers (or RF bands) A and B, while receipt by the wireless device 102 of a TAG MAC CE that includes the TAG ID value of 1 from the gNodeB 112 of the cellular wireless network indicates that the wireless device 102 should use UL transmit carriers (or RF bands) C and D. The TAG MAC CE can also include a field that specifies a timing advance command (TAC) value to be used with the TAG.

In some embodiments, a wireless device 102 determines a quiescent time period between use of a first set of UL transmit carriers (or RF bands) and a second set of UL transmit carriers (or RF bands) based on an UL transmit carrier switching gap 210 time period and on a timing adjustment value received in a command, such as a TAG MAC CE, from a gNodeB 112 of a cellular wireless network. The wireless device 102 can be configured to switch between sets of UL transmit carriers (or RF bands), where each set of UL transmit carriers (or RF bands) belong to a single TAG having an associated timing advance value specified by the cellular wireless network. The wireless device 102 can be activated to use a particular set of UL transmit carriers (or RF bands) in response to receipt of a TAG MAC CE (or other command message) from the cellular wireless network that specifies the particular set of UL transmit carriers (or RF bands), such as by identifying the TAG to which the particular set of UL transmit carriers (or RF bands) belongs. When the wireless device 102 is activated to dynamically switch between sets of UL transmit carriers (or RF bands) belonging to different TAGs that have different timing advance values, the wireless device 102 can wait to use the second set of UL transmit carriers (or RF bands) until after a quiescent time period having a duration at least as large as the maximum of {a configured (or specified) UL transmit carrier switching gap duration, a timing advance value or timing adjustment duration}. In some embodiments, the wireless device 102 adjusts the duration of a specified UL transmit carrier switching gap 210 time period to account for the timing adjustment value of the second set of UL transmit carriers (or RF bands) associated with the TAG used after the switch. In some embodiments, a wireless device 102 is not required to use an UL transmit carrier switching gap 210 time period but does include a quiescent time period of at least the length of (or based on) a timing advance value when switching between different TAGs that have different timing advance values.

Figure 3A:
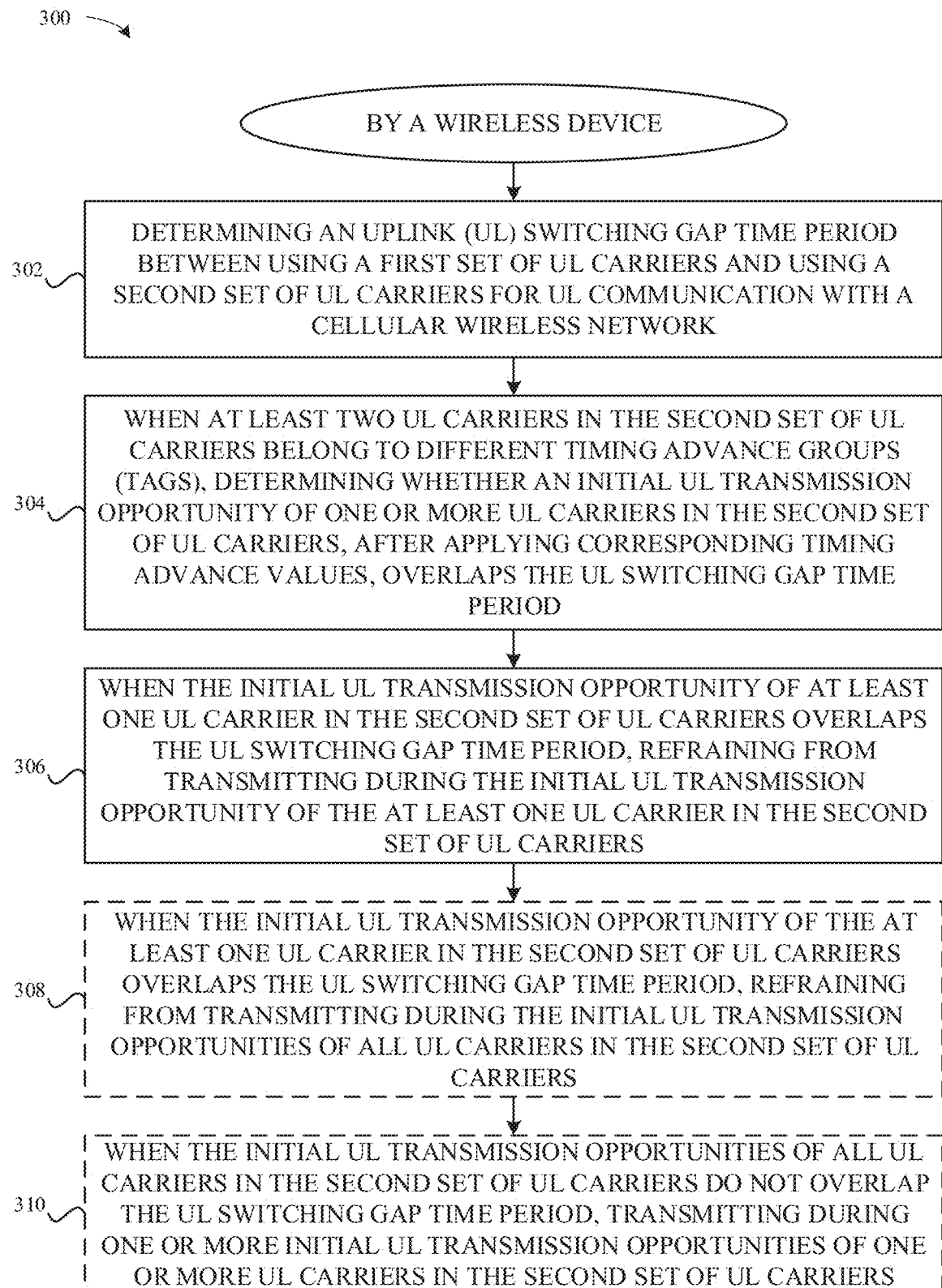
FIGS. 3A, 3B, and 3C illustrate flowcharts of exemplary methods for managing uplink transmissions when switching uplink transmit carriers, according to some embodiments.

FIG. 3A illustrates a flowchart 300 of a method performed by a wireless device 102 to manage uplink transmissions when switching uplink transmit carriers. At 302, the wireless device 102 determines an uplink (UL) switching gap time period between using a first set of UL carriers and using a second set of UL carriers for UL communication with a cellular wireless network. At 304, the wireless device 102 determines, when at least two UL carriers in the second set of UL carriers belong to different timing advance groups (TAGs), whether an initial UL transmission opportunity of one or more UL carriers in the second set of UL carriers, after applying corresponding timing advance values, overlap the UL switching gap time period. At 306, the wireless device 102, when the initial UL transmission opportunity of at least one UL carrier in the second set of UL carriers overlaps the UL switching gap time period, refrains from transmitting during the initial UL transmission opportunity of the at least one UL carrier in the second set of UL carriers. In some embodiments, at 308, when the initial UL transmission opportunity of the at least one UL carrier in the second set of UL carriers overlaps the UL switching gap time period, the wireless device 102 refrains from transmitting during the UL transmission opportunities of all UL carriers in the second set of UL carriers. In some embodiments, at 310, when the initial UL transmission opportunities of all UL carriers in the second set of UL carriers do not overlap the UL switching gap time period, the wireless device 102 transmits during one or more initial UL transmission opportunities of one or more UL carriers in the second set of UL carriers. In some embodiments, at least two of the one or more initial UL transmission opportunities of the one or more UL carriers overlap in time. In some embodiments, when the initial UL transmission opportunities of all UL carriers in the second set of UL carriers do not overlap the UL switching gap time period, the wireless device 102 transmits first UL frames of each UL carrier in the second set of UL carriers sequentially during non-overlapping UL transmission opportunities after switching to using the second set of UL carriers.

Figure 3B:
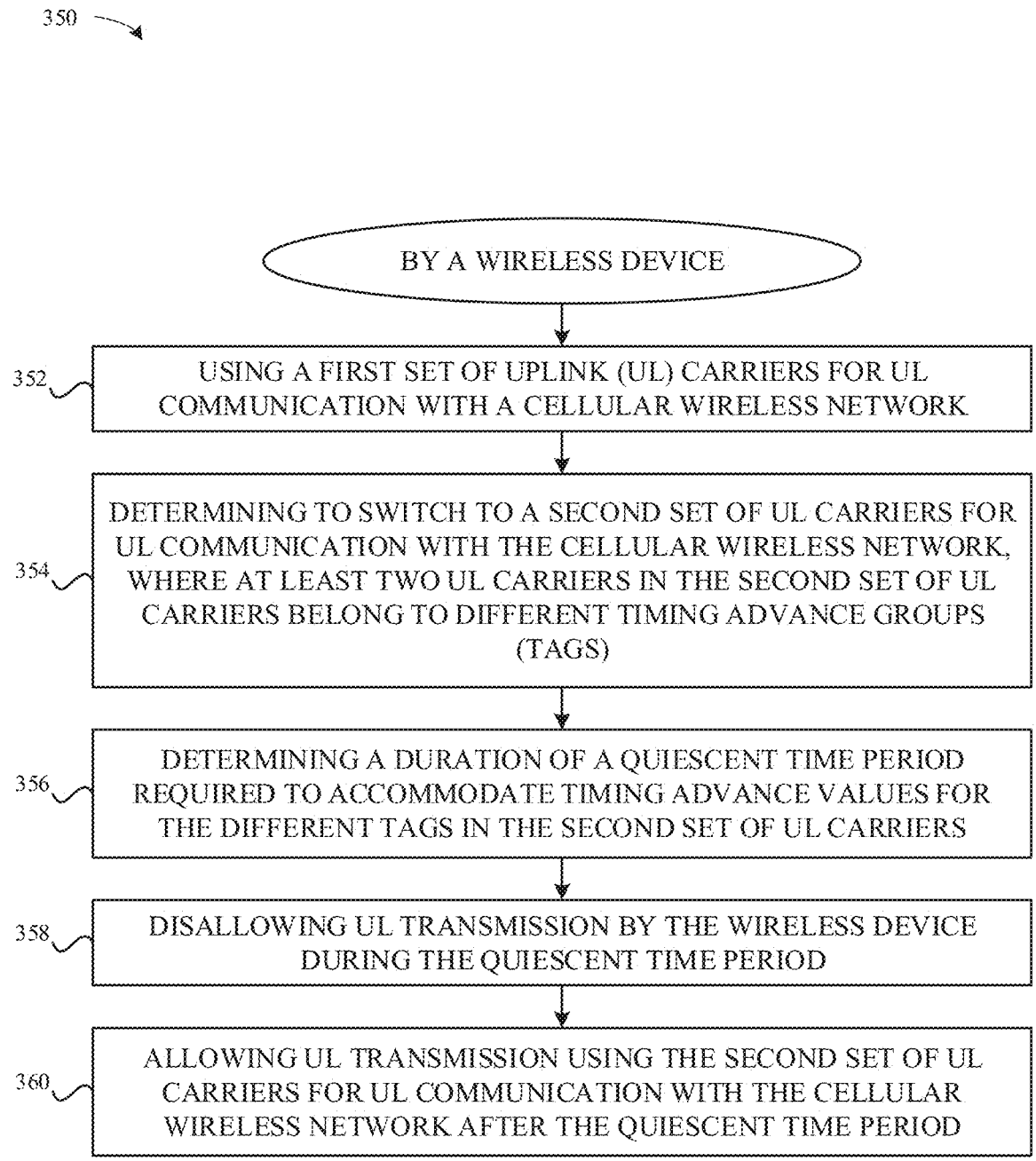

FIG. 3B illustrates a flowchart 350 of another method performed by a wireless device 102 to manage uplink transmissions when switching uplink transmit carriers. At 352, the wireless device 102 uses a first set of uplink (UL) carriers for UL communication with a cellular wireless network. At 354, the wireless device 102 determines to switch to a second set of UL carriers for UL communication with the cellular wireless network, where at least two UL carriers in the second set of UL carriers belong to different timing advance groups (TAGs). At 356, the wireless device 102 determines a duration of a quiescent time period required to accommodate timing advance values for the different TAGs in the second set of UL carriers. At 358, the wireless device 102 disallows UL transmission during the quiescent time period. At 360, the wireless device 102 allows UL transmission using the second set of UL carriers for UL communication with the cellular wireless network after the quiescent time period. In some embodiments, the duration of the quiescent time period equals or exceeds a switching gap time period duration configured for the wireless device 102. In some embodiments, the duration of the quiescent time period ensures first UL transmission occasions on all UL carriers in the second set of UL carriers do not overlap the quiescent time period.

Figure 3C:
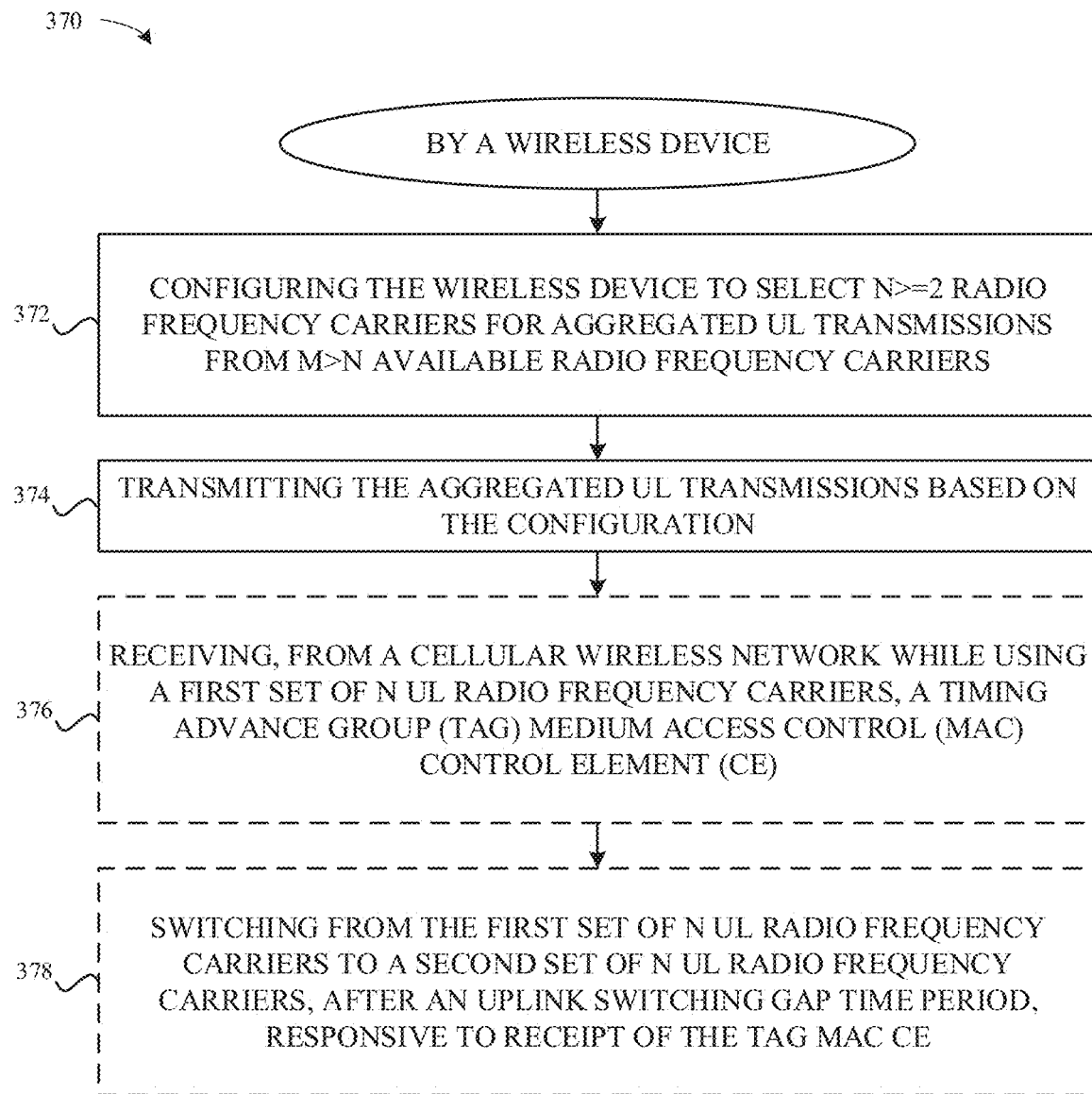

FIG. 3C illustrates a flowchart 370 of an exemplary method for managing uplink (UL) transmit switching for multiple carriers with multiple timing advance groups (TAGs) performed by a wireless device 102. The wireless device 102, at 372, manages uplink (UL) transmit switching with multiple timing advance groups (TAGs) by configuring the wireless device 102 to select N≥2 radio frequency carriers for aggregated UL transmissions from M>N available radio frequency carriers, where i) the M available radio frequency carriers are divided into distinct timing advance groups (TAGs), each TAG having a distinct timing advance value, and ii) the N radio frequency carriers selected for aggregated UL transmissions belong to a single TAG. At 374, the wireless device 102 transmits the aggregated UL transmissions based on the configuration. At 376, the wireless device 102 receives, from a cellular wireless network while using a first set of N UL radio frequency carriers, a timing advance group (TAG) medium access control (MAC) control element (CE). At 378, the wireless device 102 switches from the first set of N UL radio frequency carriers to a second set of N UL radio frequency carriers, after an uplink switching gap time period, responsive to receipt of the TAG MAC CE. The wireless device 102 refrains from transmitting using the first or second sets of N UL radio frequency carriers during the uplink switching gap time period. In some embodiments, the TAG MAC CE includes a TAG identifier (ID) value that indicates the second set of N UL radio frequency carriers. In some embodiments, the TAG MAC CE includes a timing advance control (TAC) value that indicates a timing advance value for the second set of N UL radio frequency carriers. In some embodiments, the wireless device 102 determines a length of the uplink switching gap time period based on the timing advance value for the second set of N UL radio frequency carriers. In some embodiments, different TAG ID values correspond to different sets of N UL radio frequency carriers, each set of N UL radio frequency carriers belonging to a common TAG.

Representative Exemplary Apparatus

Figure 4:
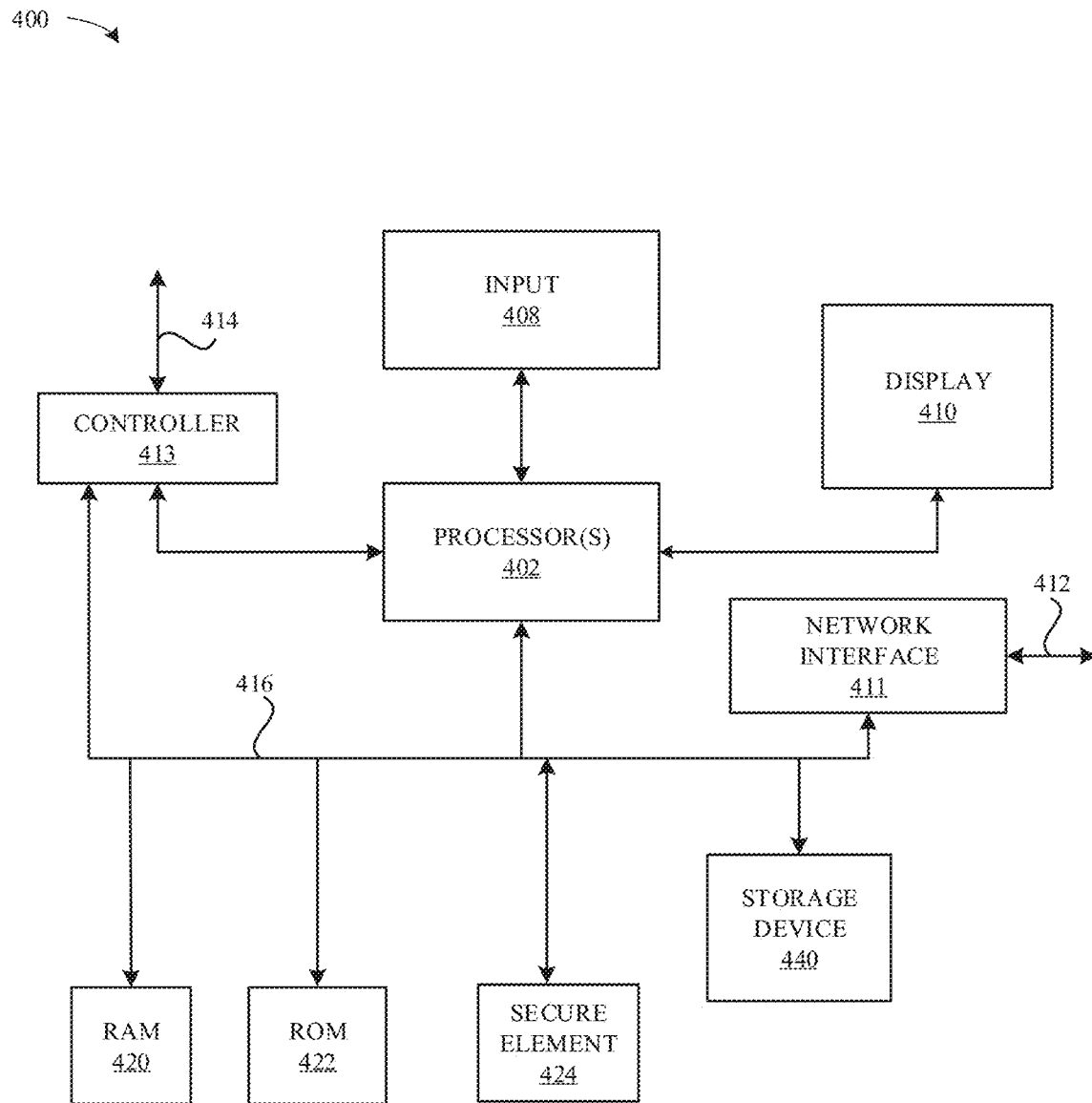
FIG. 4 illustrates a block diagram of exemplary elements of a mobile wireless device, according to some embodiments.

FIG. 4 illustrates in block diagram format an exemplary computing device 400 that can be used to implement the various components and techniques described herein, according to some embodiments. In particular, the detailed view of the exemplary computing device 400 illustrates various components that can be included in a wireless device, e.g., wireless device 102-A, 102-B, and/or 102-C. As shown in FIG. 4, the computing device 400 can include one or more processors 402 that represent microprocessors or controllers for controlling the overall operation of computing device 400. In some embodiments, the computing device 400 can also include a user input device 408 that allows a user of the computing device 400 to interact with the computing device 400. For example, in some embodiments, the user input device 408 can take a variety of forms, such as a button, keypad, dial, touch screen, audio input interface, visual/image capture input interface, input in the form of sensor data, etc. In some embodiments, the computing device 400 can include a display 410 (screen display) that can be controlled by the processor(s) 402 to display information to the user (for example, information relating to incoming, outgoing, or active communication sessions). A data bus 416 can facilitate data transfer between at least a storage device 440, the processor(s) 402, and a controller 413. The controller 413 can be used to interface with and control different equipment through an equipment control bus 414. The computing device 400 can also include a network/bus interface 411 that couples to a data link 412. In the case of a wireless connection, the network/bus interface 411 can include wireless circuitry, such as a wireless transceiver and/or baseband processor. The computing device 400 can also include a secure element 424. The secure element 424 can include an eUICC.

The computing device 400 also includes a storage device 440, which can include a single storage or a plurality of storages (e.g., hard drives), and includes a storage management module that manages one or more partitions within the storage device 440. In some embodiments, storage device 440 can include flash memory, semiconductor (solid state) memory or the like. The computing device 400 can also include a Random-Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of the computing device 400.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), 5G, and/or 5G-Advanced or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when 5G, LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing uplink (UL) transmit switching for multiple carriers with multiple timing advance groups (TAGs), the method comprising:
    by a wireless device:
        selecting a first set of $N \geq 2$ UL radio frequency carriers for aggregated UL transmissions from $M > N$ available radio frequency carriers,
        wherein:
            the M available radio frequency carriers are divided into distinct timing advance groups (TAGs), each TAG having a distinct timing advance value, and the N radio frequency carriers selected for aggregated UL transmissions belong to a single TAG;
transmitting the aggregated UL transmissions via the first set of N UL radio frequency carriers;
selecting, from the M available radio frequency carriers, a second set of N UL radio frequency carriers belonging to a second TAG;
determining a quiescent time period based on an UL transmit carrier switching gap time period and on a timing advance value for the second TAG; and
switching UL transmission from the first set of N UL radio frequency carriers to the second set of N UL radio frequency carriers after the quiescent time period.

2. The method of claim 1, further comprising:
by the wireless device:
receiving, from a cellular wireless network while using a first set of N UL radio frequency carriers, a timing advance group (TAG) medium access control (MAC) control element (CE),
wherein the TAG MAC CE indicates the second TAG.

3. The method of claim 2, further comprising:
by the wireless device:
refraining from transmitting using the first or second sets of N UL radio frequency carriers during the quiescent time period.

4. The method of claim 2, wherein the TAG MAC CE includes a TAG identifier (ID) value that indicates the second set of N UL radio frequency carriers.

5. The method of claim 4, wherein the TAG MAC CE further includes a timing advance control (TAC) value that indicates the timing advance value for the second set of N UL radio frequency carriers.

6. The method of claim 4, wherein different TAG ID values correspond to different sets of N UL radio frequency carriers, each set of N UL radio frequency carriers belonging to a common TAG.

7. The method of claim 5, further comprising:
by the wireless device:
determining a length of the quiescent time period to equal or exceed a maximum of i) a configured or specified UL transmit carrier switching gap duration and ii) the timing advance value for the second TAG.

8. The method of claim 2, further comprising:
by the wireless device:
when i) at least two first UL transmission opportunities of the second set of N UL radio frequency carriers overlap in time and ii) the wireless device is configured to use a multiple UL transmit mode, transmitting on two or more of the at least two first UL transmission opportunities.

9. The method of claim 2, further comprising:
by the wireless device:
when i) at least two first UL transmission opportunities of the second set of N UL radio frequency carriers overlap in time and ii) the wireless device is configured to use a single UL transmit mode, transmitting on only one of the at least two first UL transmission opportunities.

10. An apparatus configurable for operation in a wireless device, the apparatus comprising one or more processors coupled to a memory storing instructions that, when executed by the one or more processors, configure the wireless device to:
select a first set of N≥2 uplink (UL) radio frequency carriers for aggregated UL transmissions from M>N available radio frequency carriers,
wherein:
the M available radio frequency carriers are divided into distinct timing advance groups (TAGs), each TAG having a distinct timing advance value, and
the N radio frequency carriers selected for aggregated UL transmissions belong to a single TAG;
transmit the aggregated UL transmissions via the first set of N UL radio frequency carriers;
select, from the M available radio frequency carriers, a second set of N UL radio frequency carriers belonging to a second TAG;
determine a quiescent time period based on an UL transmit carrier switching gap time period and on a timing advance value for the second TAG; and
switch UL transmission from the first set of N UL radio frequency carriers to the second set of N UL radio frequency carriers after the quiescent time period.

11. The apparatus of claim 10, wherein execution of the instructions further configures the wireless device to:
receive, from a cellular wireless network while using a first set of N UL radio frequency carriers, a timing advance group (TAG) medium access control (MAC) control element (CE),
wherein the TAG MAC CE indicates the second TAG.

12. The apparatus of claim 11, wherein execution of the instructions further configures the wireless device to:
refrain from transmitting using the first or second sets of N UL radio frequency carriers during the quiescent time period.

13. The apparatus of claim 11, wherein the TAG MAC CE includes a TAG identifier (ID) value that indicates the second set of N UL radio frequency carriers.

14. The apparatus of claim 11, wherein execution of the instructions further configures the wireless device to:
when i) at least two first UL transmission opportunities of the second set of N UL radio frequency carriers overlap in time and ii) the wireless device is configured to use a multiple UL transmit mode, transmit on two or more of the at least two first UL transmission opportunities.

15. The apparatus of claim 11, wherein execution of the instructions further configures the wireless device to:
when i) at least two first UL transmission opportunities of the second set of N UL radio frequency carriers overlap in time and ii) the wireless device is configured to use a single UL transmit mode, transmit on only one of the at least two first UL transmission opportunities.

16. The apparatus of claim 13, wherein the TAG MAC CE further includes a timing advance control (TAC) value that indicates the timing advance value for the second set of N UL radio frequency carriers.

17. The apparatus of claim 13, wherein different TAG ID values correspond to different sets of N UL radio frequency carriers, each set of N UL radio frequency carriers belonging to a common TAG.

18. The apparatus of claim 16, wherein execution of the instructions further configures the wireless device to:
determine a length of the quiescent time period to equal or exceed a maximum of i) a configured or specified UL transmit carrier switching gap duration and ii) the timing advance value for the second TAG.

19. A wireless device comprising:
wireless circuitry comprising a plurality of antennas;
at least one processor communicatively coupled to the wireless circuitry and to a memory storing instructions that, when executed by the at least one processor, cause the wireless device to:

select a first set of N≥2 uplink (UL) radio frequency carriers for aggregated UL transmissions from M>N available radio frequency carriers, wherein:

the M available radio frequency carriers are divided into distinct timing advance groups (TAGs), each TAG having a distinct timing advance value, and the N radio frequency carriers selected for aggregated UL transmissions belong to a single TAG;

transmit the aggregated UL transmissions via the first set of N UL radio frequency carriers;

select, from the M available radio frequency carriers, a second set of N UL radio frequency carriers belonging to a second TAG;

determine a quiescent time period based on an UL transmit carrier switching gap time period and on a timing advance value for the second TAG; and switch UL transmission from the first set of N UL radio frequency carriers to the second set of N UL radio frequency carriers after the quiescent time period.

20. The wireless device of claim 19, wherein execution of the instructions further configures the wireless device to:

receive, from a cellular wireless network while using a first set of N UL radio frequency carriers, a timing advance group (TAG) medium access control (MAC) control element (CE), wherein the TAG MAC CE indicates the second TAG.

* * * * *